United States Patent
Rajagopalan et al.

(10) Patent No.: US 8,852,436 B2
(45) Date of Patent: Oct. 7, 2014

(54) SOLVENT REMOVAL AND RECOVERY FROM INORGANIC AND ORGANIC SOLUTIONS

(75) Inventors: Nandakishore Rajagopalan, Champaign, IL (US); Vinodkumar Ambalal Patel, Urbana, IL (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 320 days.

(21) Appl. No.: 13/144,661

(22) PCT Filed: Jan. 25, 2010

(86) PCT No.: PCT/US2010/021932
§ 371 (c)(1),
(2), (4) Date: Jul. 14, 2011

(87) PCT Pub. No.: WO2010/088170
PCT Pub. Date: Aug. 5, 2010

(65) Prior Publication Data
US 2011/0272355 A1   Nov. 10, 2011

Related U.S. Application Data

(60) Provisional application No. 61/148,270, filed on Jan. 29, 2009.

(51) Int. Cl.
| | | |
|---|---|---|
| B01D 11/04 | (2006.01) | |
| C02F 1/26 | (2006.01) | |
| C02F 1/02 | (2006.01) | |
| B01D 61/00 | (2006.01) | |
| B01D 61/58 | (2006.01) | |
| C02F 1/38 | (2006.01) | |
| C02F 1/52 | (2006.01) | |
| C02F 1/44 | (2006.01) | |
| C02F 103/08 | (2006.01) | |

(52) U.S. Cl.
CPC ... *C02F 1/26* (2013.01); *C02F 1/38* (2013.01); *C02F 1/52* (2013.01); *C02F 1/441* (2013.01); *B01D 11/0446* (2013.01); *B01D 61/005* (2013.01); *C02F 1/02* (2013.01); *C02F 2103/08* (2013.01); *B01D 61/002* (2013.01)
USPC ........... 210/639; 210/787; 210/806; 210/774; 210/789; 210/749; 210/800; 210/804; 210/642; 210/651

(58) Field of Classification Search
None
See application file for complete search history.

(56) References Cited

U.S. PATENT DOCUMENTS 3,386,912 A    6/1968  Larare
4,781,837 A *  11/1988  Lefebvre ................. 210/640
(Continued)

OTHER PUBLICATIONS

BASF Corporation, "Technical Bulletin: Lutensol (R) OP-10 Octylphenol Ethoxylate." Copyright 2005, available at <http://worldaccount.basf.com>, accessed Sep. 17, 2013.*

(Continued)

*Primary Examiner* — Katherine Zalasky
(74) *Attorney, Agent, or Firm* — Brinks Gilson & Lione

(57) ABSTRACT

A process for recovering solvents from inorganic and organic solutions is disclosed. The process utilizes a polymer capable of selectively extracting the solvent from the inorganic or organic solution. Introduction of the polymer into the solvent solution creates formation of a polymer-rich phase and a solute-rich phase. The recovered solvent may be separated from the polymer-rich phase by heating the polymer-rich phase to at least the cloud point of the polymer. The polymer and/or solute may be recycled for further use in the solvent recovery process.

25 Claims, 2 Drawing Sheets

(56) References Cited

U.S. PATENT DOCUMENTS

| | | | |
|---|---|---|---|
| 5,512,180 A * | 4/1996 | Ho | 210/643 |
| 5,679,254 A | 10/1997 | Chakrabarti | |
| 5,948,263 A | 9/1999 | Chaiko et al. | |
| 8,021,553 B2 | 9/2011 | Iyer | |
| 2006/0144789 A1 | 7/2006 | Cath et al. | |

OTHER PUBLICATIONS

PCT Search Report mailed Sep. 1, 2010 for corresponding PCT Application No. PCT/US2010/021932.

Written Opinion of the International Searching Authority mailed Sep. 1, 2010 for corresponding PCT Application No. PCT/US2010/021932.

* cited by examiner

SOLVENT REMOVAL AND RECOVERY FROM INORGANIC AND ORGANIC SOLUTIONS

RELATED APPLICATIONS

The present patent document is a National Stage of International Application PCT/US2010/021932 filed Jan. 25, 2010, which claims the benefit of the filing date under 35 U.S.C. §119(e) of Provisional U.S. Patent Application Ser. No. 61/148,270, filed Jan. 29, 2009. The entirety of both applications which is hereby incorporated by reference.

BACKGROUND

The present disclosure relates to the separation of solvent from inorganic and organic solutions, and more particularly to the removal and purification of solvent from a salt solution stream.

The removal of solvents from inorganic or organic solutions is practiced widely in industry. Typically, the solvent to be removed is contained within an inorganic or organic solution stream. Thereafter, the solvent is often subject to purification processing steps. The purified solvent may be sold as an intermediate chemical solvent for use in subsequent chemical and industrial processes. Alternatively, the purified solvent may be sold as an end-product for consumer use.

Water is a typical solvent which is often contained in various inorganic and organic degraded sources. Water contained within such degraded sources typically is not useable. Accordingly, the water is generally recovered from such degraded sources to enable it to be useable and of value in several intermediate and end-product applications. Currently, the recovery of water from degraded sources is being employed on an industry-wide basis. As an example, water is being recovered from brackish or seawater streams by conventional methods such as evaporation and reverse osmosis. Water is also being recovered from other degraded water sources, such as agricultural runoff and industrial waste streams.

Many of the conventional recovery processes for solvents such as water are energy intensive, requiring relatively high temperature and pressure operating levels such that the process fails to be cost effective. Accordingly, water sources which allow the recovery of water without energy intensive processes are preferable. However, the availability of such water sources is rapidly decreasing. Accordingly, there is a need for a process which readily allows recovery of solvents such as water from their respective organic and inorganic streams.

SUMMARY

In a first aspect, a method of recovering a solvent from an osmotic agent solution stream is provided. Polymer having a predetermined cloud point temperature is introduced into a first separator comprising the osmotic agent solution stream. A two-phase mixture comprising a first phase and a second phase is created. The first phase comprises the osmotic agent solution stream and the second phase comprises the polymer with the extracted solvent. Solvent is thereby extracted from the osmotic agent solution stream to the second polymer phase. The second phase is separated from the first phase. The second phase is heated in a second separator to at least a cloud point temperature of the polymer to create a polymer rich phase and a solvent rich phase. The polymer rich phase is separated from the solvent rich phase comprising at least 95 wt % of the extracted solvent.

In a second aspect, a method of recovering water from a feed salt solution stream is provided. A feed salt solution is introduced into an upstream unit at a first osmotic pressure. An osmotic agent solution comprising an effective amount of an osmotic agent in which the osmotic agent solution comprises a second osmotic pressure greater than the first osmotic pressure is also introduced into the upstream unit, thereby inducing a flow of water from the feed salt solution into the osmotic agent solution. The feed salt solution is discharged from the upstream unit, such that the discharged solution has a salt concentration higher than a salt concentration of the feed salt solution. The osmotic agent solution is discharged from the upstream unit and enters into an extraction process, whereby a polymer solution having a predetermined cloud point temperature and comprising a polymer selectively absorbs the water from the osmotic agent solution to create a dehydrated osmotic agent solution. The polymer solution with the absorbed water is heated above the cloud point temperature to release the water from the polymer solution and produce a polymer rich phase and a water-rich phase so that the water rich phase comprises at least 95 wt % water.

In a third aspect, a method of desalinating a salt water stream is provided. A salt water solution is introduced into an upstream unit at a first osmotic pressure. An osmotic agent solution comprising an effective amount of an osmotic agent is introduced into the upstream unit. The osmotic agent solution has a second osmotic pressure greater than the first osmotic pressure. A flow of water is induced from the salt water solution into the osmotic agent solution. The salt water solution is discharged from the upstream unit. A first portion of the osmotic agent solution is cooled to crystallize a first portion of the osmotic agent from the osmotic agent solution. The osmotic agent solution is discharged from the upstream unit into an extraction process, whereby a polymer solution having a predetermined cloud point temperature selectively absorbs the water from the osmotic agent solution. The polymer solution is heated with the absorbed water to at least the cloud point temperature to release the water from the polymer solution and produce a polymer rich phase and a water rich phase having a composition of at least 95 wt % water.

DETAILED DESCRIPTION

The relationship and functioning of the various elements of this invention are better understood by the following detailed description. However, the embodiments of this invention as described below are by way of example only. Unless otherwise specified, all percentages expressed herein are weight percentages based on the whole mixture.

Figure 1:
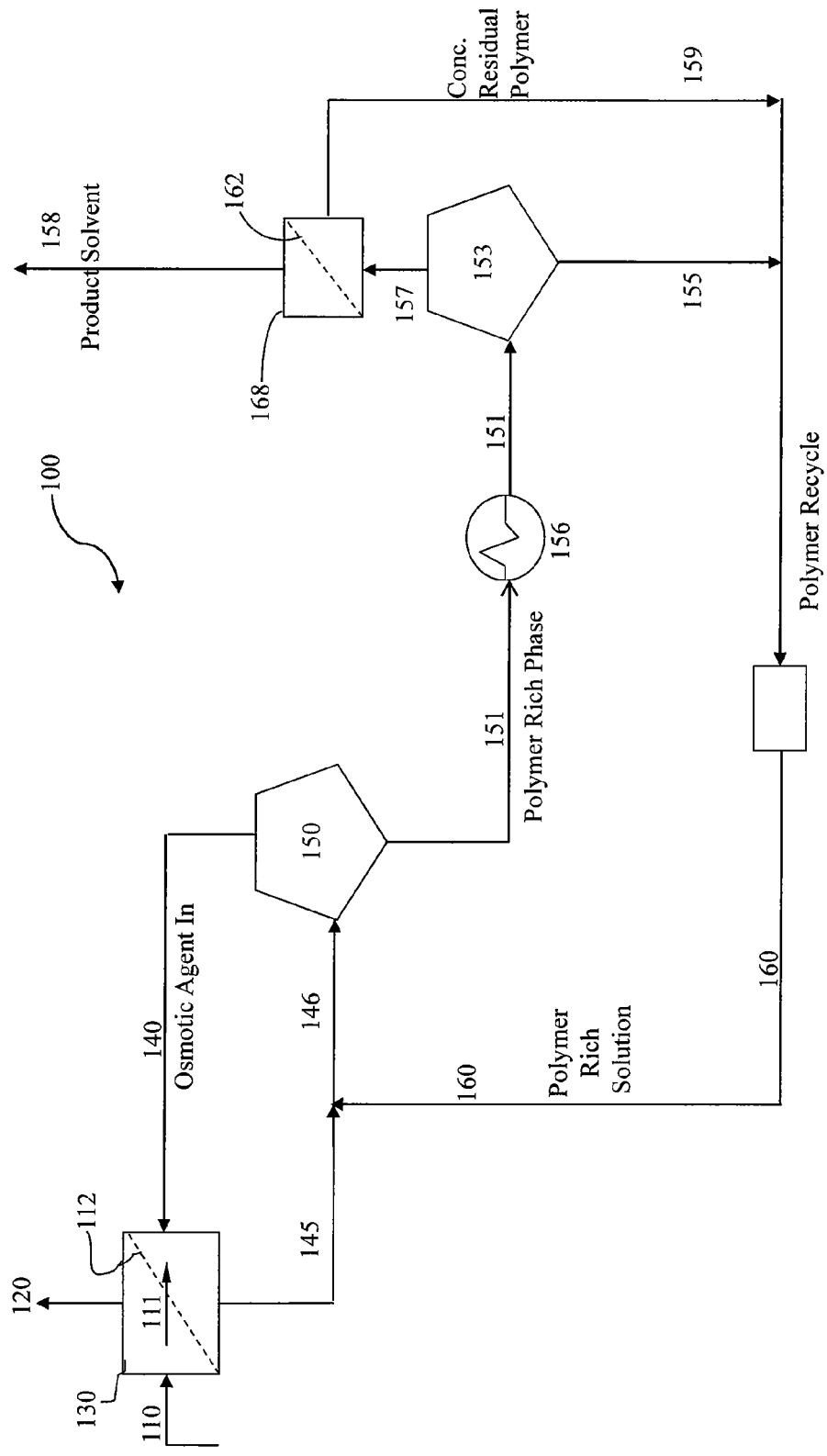
FIG. 1 shows a process schematic of an embodiment of a solvent extraction process.

An exemplary solvent recovery process 100 for capturing solvent 111 from a feed stream will now be described in conjunction with FIG. 1. FIG. 1 shows a feed stream 110 comprising a solvent 111 and solute. The solvent 111 may be any type of inorganic or organic solvent. The solvent may be present in a matrix that is a gas, vapor, liquid, or solid. Generally speaking, the solvent 111 may be recovered as a purified product stream 158 from feed stream 110, and the solute may exit an upstream processing module as concentrated stream 120.

In one embodiment, the feed stream 110 may be a liquid. Referring to FIG. 1, the feed stream 110 enters processing equipment which includes a semi-permeable membrane 112. The semi-permeable membrane includes pores which are designed to have a size that is large enough for solvent to flow through but too small for the solute to pass through. In other words, the semi-permeable membrane is impermeable to the solute but allows for the flow of the solvent 111.

An upstream processing unit may employ any of numerous types of semi-selective processes to allow solvent 111 to pass to the osmotic agent stream. Examples of semi-selective processes to allow solvent 111 to pass across the membrane 112, include, but are not limited to, microfiltration, ultrafiltration, nanofiltration, forward osmosis, pervaporation, osmotic distillation, membrane distillation, and any combination of the above. In other cases where the solvent is within a solid matrix, the flow of the solvent can be induced by other processes, such as, for example, immersion or leaching by an osmotic agent. In these cases, the semipermeability may be provided by the composition of the solid matrix itself. An example of such a process may be osmotic dehydration of vegetables or fruits where the naturally present cell walls present a semi-permeable barrier. In cases where the matrix is a present in a gaseous or vaporous form, the solvent can be induced to flow from the matrix into a receiving osmotic agent solution by vapor pressure differences or by absorption. In a preferred embodiment, a forward osmosis unit 130 is used as the means to induce solvent flow across the semi-permeable membrane, as indicated by the arrow across the membrane 112 within osmosis unit shown in FIG. 1.

The forward osmosis process utilizes a semi-permeable membrane to cause separation of the solvent from the dissolved solutes in the feed stream 110. The feed stream 110 enters a first inlet of the forward osmosis unit 130. An osmotic agent stream 140 enters a second inlet of the forward osmosis unit. A semi-permeable membrane within the forward osmosis unit serves as a barrier between the streams 110 and 140. The streams 140 and 110 are preferably flowing in opposite directions in a countercurrent flow configuration. Countercurrent flows of streams 110 and 140 enable the most concentrated feed stream 120 to contact the most concentrated osmotic agent stream 140 to ensure solvent 111 to flow due to the osmotic pressure gradient, which is defined as the difference in osmotic pressures on the two sides of the semi-permeable membrane.

The osmotic agent stream 140 comprises a selected osmotic agent in an effective amount so as to have a higher osmotic pressure than the corresponding osmotic pressure of the feed stream 110 at all locations within unit 130 (i.e., osmotic pressure of stream 140 is greater than that of stream 120 and the osmotic pressure of stream 145 is greater than that of stream 110). "Effective amount" as used herein refers to selecting a concentration of the selected osmotic agent to create the necessary flow of solvent 111 from the feed stream 110 to the osmotic agent stream 140. Generally speaking, the lower the concentration of the osmotic agent, the lower the osmotic pressure of the stream 140. Accordingly, an effective amount of osmotic agent is dissolved into the solution of the osmotic agent stream 140 until the osmotic pressure of stream 140 is higher than that of feed stream 110 to create an osmotic pressure gradient across the membrane 112. In other words, the addition of the osmotic agent decreases the chemical potential of the corresponding solvent (i.e., the activity of the solvent) on the side of the membrane 112 containing the osmotic agent stream 140 until it is below that of the feed stream 110, thereby creating a chemical potential gradient. Such a gradient induces the flow of solvent across the semi-permeable membrane from the feed stream 110 into the osmotic agent stream 140. The maximum effective amount of the selected osmotic agent that can be added to the osmotic agent stream 140 may be limited by the solubility limit of the particular osmotic agent in the corresponding solvent of the osmotic agent stream 140 for a given temperature of the stream 140.

As the feed stream 110 and the osmotic agent stream 140 flow countercurrently along the length of the forward osmosis unit, solvent 111 flows via forward osmosis from the feed stream 110 into the osmotic agent stream 140, as indicated by the arrow within unit 130. The flow of solvent continues so long as the osmotic pressure gradient exists between the streams 110 and 140 at all locations within unit 130. The osmotic pressure gradient and resultant flow of solvent 111 enables dehydration of the feed stream 110 such that concentration of the solute in the feed stream increases. The flow of solvent 111 into the osmotic agent stream 140 increases the concentration of solute in feed stream 110. Feed stream 110 exits forward osmosis unit 130 as concentrated solute stream 120. Osmotic agent stream 140 exits the forward osmosis unit 130 as stream 145, which is now diluted with the solvent 111. The extent to which stream 120 becomes concentrated with solute may be governed by the amount of solvent 111 that flows from feed stream 110 to osmotic agent stream 140. The amount of solvent 111 that flows into stream 140 is driven by the osmotic pressure gradient, which is determined by how much osmotic agent can be dissolved into its solution (i.e., the solubility of the osmotic agent in its respective solvent). In other words, a higher concentration of osmotic agent within stream 140 will induce a larger amount of solvent 111 flow from feed stream 110 to osmotic agent stream 140.

The next stage of the solvent recovery process involves separating the solvent 111 from the osmotic agent contained in stream 145. A polymeric stream 160 is introduced into stream 145. The resultant mixture 146 thereafter flows into a separator 150. The polymer stream 160 has the ability to extract the solvent 111 from stream 145. Sufficient residence time is provided to allow a two-phase mixture to develop in which the polymer extracts the solvent 111. A polymer rich phase and an osmotic agent rich phase are created. The extent of the extraction of solvent 111 may be determined from a ternary phase diagram of the osmotic agent, solvent 111, and polymer components.

The osmotic agent rich phase is recycled back to forward osmosis unit 130. Preferably, trace amounts or none of the polymer is recycled back with the osmotic agent rich phase, as introduction of substantial amounts of the polymer within the osmotic agent may tend to increase viscosity or interfere with operational efficiency. The polymer rich phase with extracted solvent 111 (i.e., the polymer-solvent phase) exits the separator as stream 151. Preferably, trace amounts or none of the osmotic agent is extracted into the polymer rich phase, as this may increase subsequent solvent purification costs.

The polymer rich-solvent mixture exits the separator as stream 151. The polymer-solvent mixture 151 is heated in heater 156 at least to its predetermined cloud point temperature to release the solvent 111. Cloud point temperature can be determined by ASTM standard D2024-65 (2003).

The polymer exits separator 153 as stream 155 and thereafter may be recycled back as stream 155 and re-introduced into stream 145 after blending with stream 159 labeled concentrated residual polymer. The released solvent 111 is separated from the polymer in separator 153 and then exits separator 153 as stream 157. The released solvent 111 may then undergo one or more purification steps in downstream processing. FIG. 1 shows that the released solvent stream 157 may be purified in a purification or polishing step 168, in which any residual polymer and any residual osmotic agent from upstream is removed. The purification/polishing step 168 may be a reverse osmosis step in which external pressure is used to drive the solvent 111 across a semi-permeable membrane 162 to the other side of the membrane while the residual polymer/trace salt is retained on the inlet side of the membrane. With the residual polymer/trace salt isolated from the solvent 111, the residual polymer/trace salt may be recycled back as stream 159, combined with stream 155 and re-introduced into stream 145 to selectively extract additional solvent from additional osmotic agent stream 145 that is exiting forward osmosis unit 130.

Other polishing steps for recovering residual polymer may be utilized, including for example, oxidation, adsorption, absorption, ion exchange, membrane distillation, ultrafiltration, microfiltration, nanofiltration, foam fractionation, dissolved air flotation, coacervation, precipitation, crystallization, chromatographic separations or solvent extraction with a water immiscible solvent, electrodialysis, capacitive deionization, combination thereof, or other means of separations as readily apparent to one of ordinary skill in the art to remove/capture any residual polymer or trace salt. Furthermore, operations such as sequential cloud point extractions, or staged cloud point extractions in combination with phase separations that may result in either increased solvent recovery or lower processing costs are clearly contemplated as part of this disclosure.

It is contemplated that the above described recovery process may occur on a continuous basis for a given uninterrupted time period at predetermined mass flow rates. Alternatively, the recovery process may occur on a batch basis comprising discrete processing stages.

It is also contemplated that the process can be carried out in stages. In one example, the exiting process stream 145 is initially contacted with a polymer stream followed by separator 150 that results in streams 151 and 140. In a subsequent step, stream 140 can be further contacted with the polymer to result in a second fractionation. Such steps have the advantage of producing a concentrated osmotic agent for subsequent use in forward osmosis unit 130 while allowing for additional solvent recovery.

Numerous types of polymers and co-polymers (linear, branched, dendrimers, etc.) for extraction of the solvent can be used either singly or in combination, including for example, ethoxy(hydroxyethyl) cellulose, polyvinyl alcohol, poly(n-vinylcaprolactam), polyethylene glycol, polypropylene oxide, copolymers of polyethylene oxide and polypropylene oxide, polymers of alkylene oxides, Triton® X-114, polyvinyl alcohol acetate, ethoxylated cellulose, acrylate-acrylic copolymers, phosphorus containing polyolefins, partially substituted ethyl and methyl cellulose ethers, copolymers of vinyl alcohol and methyl vinyl ketone, copolymers of maleic acid diesters of propylene glycol and butyl alcohol with maleic acid diesters of propylene glycol and octyl alcohol, copolymers of propylene glycol methacrylate and methyl methacrylate, copolymers of vinyl alcohol or maleic acid diesters of propylene glycol and butyl alcohol, copolymers of propylene glycol methacrylate or methylvinylether and methallyl alcohol or methylvinyl ketone or maleic acid diesters of propylene glycol and octyl alcohol or methyl methacrylate or acrylonitrile or styrene, copolymers of vinyl pyrollidone, acrylamide, ethyleneamine, hexamethyleneimine, vinyl carbazole and vinyl pyridine or copolymers of methallyl alcohol or methyl vinyl ketone or maleic acid diester of propylene glycol and octyl alcohol or methyl methacrylate or acrylonitrile or styrene; polyethylene oxide polybutyleneoxide, polyethylene oxide-polytetramethyleneether, polyvinylpyrrolidone, methoxypolyethyleneglycol, polyglycol terpolymers such as U-11755®, vinylpyrrolidone/vinyl acetate copolymer and others as elucidated in U.S. Pat. No. 3,386,912. Additionally, the polymers disclosed in U.S. Pat. Nos. 3,438,893, 3,234,125, 3,234,126, 3,441,501, 3,451,926, 5,354,835 may be utilized and are hereby incorporated by reference. Other suitable polymers can be found in compilations such as CRC handbook of thermodynamics data of aqueous polymer solutions (2004) by C. Wohlfarth: CRC Press, Boca Raton, Fla., USA. The above described polymers may be fluid-like in structure. Alternatively, the above described polymers may be synthesized to create a relatively more rigid structure by cross-linking so as to create a resin or film type structure. One example of a suitable cross linked polymer is N-vinyl-2-ethyl-imidazole, which is cross-linked with dibromo-p-xylene.

Preferably, the above listed polymers will have a molecular weight between 500 and 10,000 Daltons. Such a range of molecular weight maintains the viscosity at a relatively low level such that handling and transport difficulties are avoided. Additionally, increasing the molecular weight significantly beyond 10,000 Daltons may reduce the osmotic pressure of osmotic agent stream 140 if any portion of the polymer is recycled back to the forward osmosis unit 130. The reduction of osmotic pressure will decrease the osmotic pressure gradient that induces solvent flow from the feed stream 110 to the osmotic agent stream 140.

Numerous types of osmotic agents are contemplated for use either singly or in combination. For example, the osmotic agent may be an ionized salt, ionic polymer, ionic liquids, nonionic polymer, or organic compounds. Suitable examples of salts include but are not limited to sodium hydroxide, sodium carbonate, sodium silicates, disodium sulfate, trisodium phosphate, sodium formate, sodium succinate, sodium tartrate, sodium citrate, dilithium sulfate, ammonium sulfate, ammonium carbonate, ammonium carbamate, zinc sulfate, copper sulfate, iron sulfate, magnesium sulfate, aluminum sulfate, disodium monohydrogenphosphate, monosodium dihydrogenphosphate, tripotassium phosphate, dipotassium carbonate, manganese sulfate, and potassium citrate. Suitable examples of ionic polymers include but are not limited to polyacrylic acid, low molecular weight poly(ethylenesulfonic) sodium salt, polymethylacrylic sodium salt, and various copolymers. Suitable examples of nonionic polymers include but are not limited to dextran; dimer, trimers, etc. of sugars including for example glucose, fructose and the like. Suitable examples of organic compounds include, but are not limited to glycerol, ethylene glycol, diethylene glycol, triethanolamine, ethanol, propanol, acetone, and diethylether. Preferably the osmotic agent is disodium hydrogen phosphate or magnesium sulfate.

Numerous types of feed streams may be processed, including solids, gases, and liquids, in which the solute in the feed stream may be present in any concentration. For example, the feed stream may be seawater comprising NaCl as the solute. Alternatively, the feed stream may comprise municipal water or treatment plant effluent comprising various contaminant solutes to be separated from the water, or process effluents such as cooling tower, boiler blowdown, or ion exchange rinses and regenerant solution. The feed streams listed here are illustrative by way of example and are not intended to be limiting.

In a preferred embodiment, the feed stream to be processed is seawater, and the seawater may comprise about 4 wt % or less NaCl of the total mixture. The salt may be separated from the water in a desalination process similar to the solvent recovery process explained above. The seawater feed stream is dehydrated utilizing a forward osmosis unit into which an osmotic agent stream having a predetermined concentration of osmotic agent salt is introduced therein.

Similar to the solvent recovery process described above, the pore size of the semi-permeable membrane is sufficiently large to enable the solvent water to flow from the seawater feed stream into the osmotic agent stream. However, the pore size is too small to allow the NaCl to flow through. The net flow of water into the osmotic agent stream from the seawater feed stream dilutes the osmotic agent stream while increasing the concentration of the NaCl in the seawater feed stream. Accordingly, stream 120 exits the forward osmosis unit dehydrated and increasingly concentrated in NaCl while stream 145 exits forward osmosis unit diluted with the water 111 such that concentration of the osmotic agent salt has decreased.

The recovery of the water from the osmotic agent stream 145 involves introducing polymer stream 160 into the osmotic agent stream to selectively extract the water from stream 145. The polymer utilized in the extraction of the desalination process may be a copolymer. The above described copolymers may be random, in which the polymerization of each of the monomers occurs in a random manner. Alternatively, the above described copolymers may be a block structure in which polymerization of the first monomer occurs, thereafter followed by polymerization of the second monomer to create a resultant structure having defined and discrete domains of each of the polymerized chains within the copolymer.

The copolymer in the desalination process preferably has a hydrophilic polymeric region which binds to the water to facilitate extraction of the water from the osmotic agent solution stream 145 that exits the forward osmosis unit. The copolymer preferably has a hydrophobic polymeric region that is relatively weakly bound to the water, thereby facilitating separation of the polymer from the water at a lower temperature compared to a polymer containing only hydrophilic regions. The combination of hydrophilic and hydrophobic regions affords an overall copolymer structure having a lower cloud point temperature relative to the cloud point temperature of a polymer that has only hydrophilic regions. Unlike a copolymer having hydrophobic and hydrophilic regions, a polymer with only a hydrophilic region requires more energy to break the hydrogen bonds and therefore will possess a higher cloud point temperature.

In a preferred embodiment, a random copolymer comprising polyethylene oxide and polypropylene oxide (PEO-PPO) may be used. The PEO-PPO copolymer mixture can be commercially obtained from DOW Chemical as UCON® 50 HB-660. Polymers of similar composition can also be obtained commercially from many other chemical producers. UCON® 50 HB-660 is substantially nontoxic such that residual amounts of the polymers in water 111 can exit stream 157 without posing any health risk. Introduction of the PEO-PPO random copolymer into stream 145 (i.e., the osmotic agent stream 140 which exits the forward osmosis unit and which is now diluted with the solvent water 111) enables water to be extracted from stream 145, thereby creating a polymer-water rich phase and an osmotic agent rich phase. Subsequent heating of the copolymer of PEO-PPO and water 111 mixture slightly beyond its cloud point temperature releases the extracted water from the PEO-PPO copolymer. Specifically, this particular copolymer of PEO-PPO will release water when the polymer rich phase mixture 151 is heated slightly above its cloud point temperature a range between about 60° C. and about 80° C.

Laboratory Procedure

Known quantities of aqueous solutions of $MgSO_4$ heptahydrate were mixed with known quantities of 100% UCON® 50-HB-660 to obtain mixtures of varying salt and polymer concentrations. The resulting mixtures were allowed to separate to produce a polymer rich phase and a salt rich phase. Separation was carried out either under gravity or under a centrifugal field. The quantities of the polymer rich phase and the salt rich phase were measured. The phases were analyzed for their respective $MgSO_4$ and UCON® 50-HB-660 contents by ICP-MS and HPLC Chromatography methods as known in the art. The composition data along with phase quantity allowed complete mass balances (shown below) to be constructed for the mixture compositions. The polymer rich phase was then subject to heating above the cloud point to obtain a polymer rich phase and a substantially water rich phase with small residual amounts of polymer and salt. The quantities of the water rich phase and polymer rich phases were determined by measurement and their phase compositions analyzed as previously mentioned above. The temperature of phase separation was varied to determine its effect on phase composition and quantity.

Separately, an experiment was carried out in which a water rich solvent phase with varying amounts of $MgSO_4$ and polymer was subject to purification by reverse osmosis in a conventional stirred cell module at pressures of about 400 psi. This experiment enabled estimating resulting water quality and the amount of recovery.

Data from the above experiments were then checked for data quality through mass balance closures. The resulting data set allowed the construction of flow sheets that represent multiple cycles of water extraction and purification as represented in Examples 1-6. The Examples 1-6 will be discussed with reference to FIG. 2, which represents a flow sheet for a water recovery and purification process 200 from a saline water stream using an osmotic agent solution.

EXAMPLE 1

Saline feed stream 210 entered forward osmosis unit 230 having an incoming salt content less than or equal to typical seawater. Stream 240 and 245 represented osmotic agent solutions entering and leaving the forward osmosis unit 230, respectively. The most concentrated osmotic agent stream 240 extracted water from the most concentrated seawater stream 220 while the diluted osmotic agent stream 245 extracted water from the less concentrated saline stream 210. Stream 245 was mixed with a stream 260 to produce stream 246. Stream 246 was thereafter introduced into the first separator 250 to allow separation of the polymer-water rich phase from the osmotic agent rich phase by gravitational settling. The compositional and mass balance for the process assuming a mass of 200 grams for stream 246 was determined and is shown below in Table 1. In particular, FIG. 2 and Table 1 show that upon separation of the phases within the first separator 250, 172 grams of the concentrated osmotic agent stream 240 was available for recycling back to the forward osmosis unit 230 to induce additional water flow across the membrane 212 from saline feed stream 210. Stream 240 had composition of about 22.67% $MgSO_4$, 76.82% water, and 0.51% polymer. Stream 252 exited the first separator 250 as the polymer-rich phase. The stream 252 was comprised of 28 grams of polymer rich phase having a composition of about 69% UCON® 50-HB-660 and 31% water. Favorable extraction occurred. In other words, upon extraction of the water from the osmotic agent, a majority of the $MgSO_4$ was able to be recycled from the first separator back to the forward osmosis unit, and a majority of the UCON® 50-HB-660 polymer was separated from the osmotic salt agent solution stream 240. Accordingly, MgSO$_4$ and UCON® 50-HB-660 losses were relatively low. In particular, about 0.01 grams of the MgSO$_4$ salt was extracted with the water into the polymer-rich phase, which represents about 0.03% weight loss (i.e., the amount of MgSO$_4$ which was extracted with the water into the polymer-rich phase in the first separator) based on the initial 39 grams of MgSO$_4$ contained in stream 246. It was observed that osmotic agent stream 240 contained 0.51% UCON® 50-HB-660. In other words, about 0.88 grams of the UCON® 50-HB-660 polymer was recycled back into the forward osmosis unit, as shown in Table 1. About 95.6% of the polymer was favorably separated from the osmotic agent solution and subject to further downstream processing.

Figure 2:
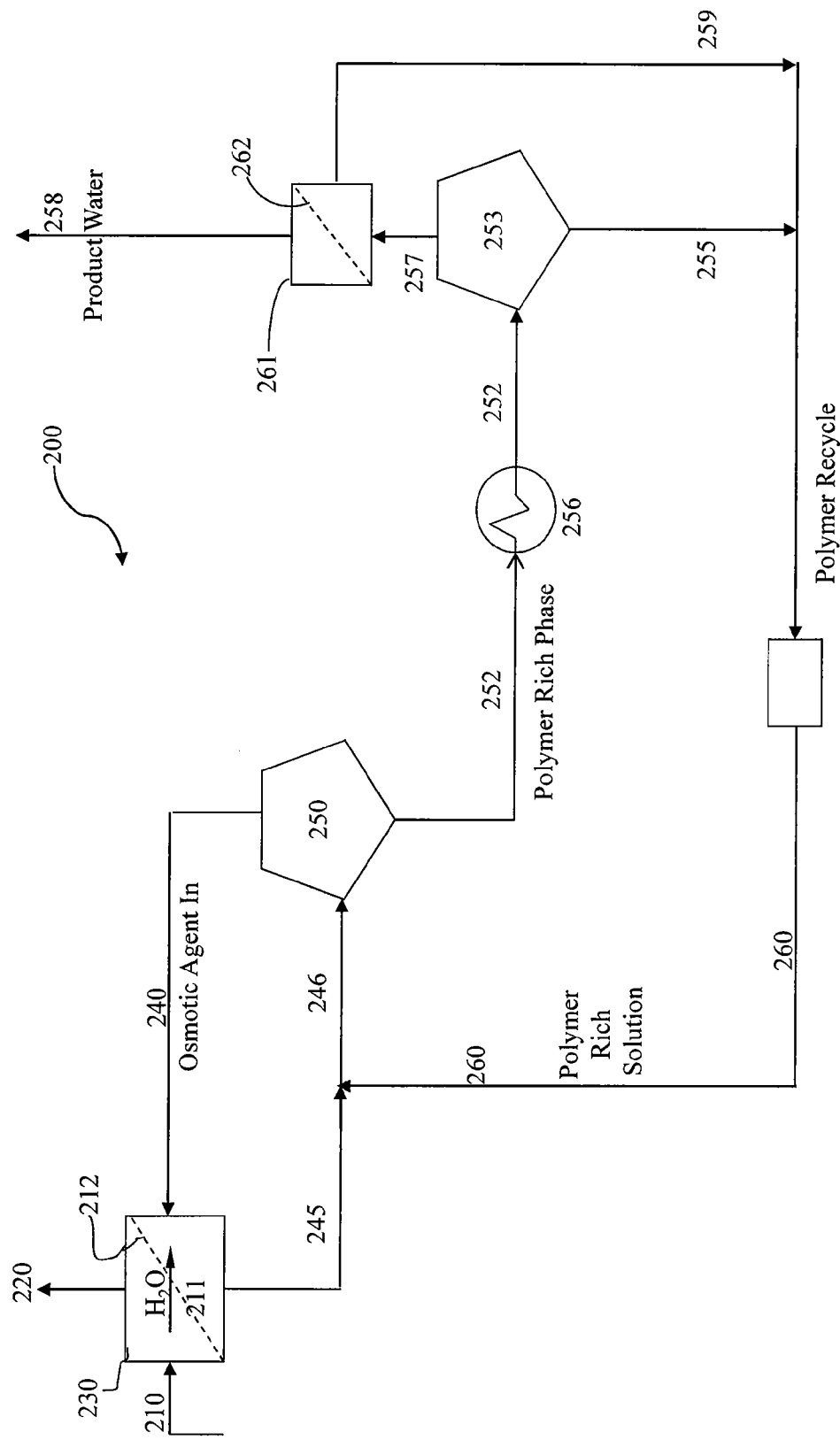
FIG. 2 shows a process schematic of an embodiment of a desalination process.

The water recovery and purification process subsequently involved separation of the desalinated water from the UCON® 50-HB-660 polymer in stream 252. Stream 252 entered a heat exchanger 256 as shown in FIG. 2. The heat exchanger raised the temperature of stream 252 to about 80° C., which was above the cloud point temperature of the UCON® 50-HB-660. Heating the stream 252 to about 80° C. resulted in formation of a polymer-rich phase and a water-rich phase. The steam 252 exited the heat exchanger and thereafter was introduced into a second separator 253 to allow separation of the polymer-rich phase from the water-rich phase. Separation of the phases was achieved by gravitational settling. The separated phases exited the second separator 253 as a water-rich phase, which is designated stream 257 in FIG. 2, and a polymer-rich phase, which is designated as stream 255 in FIG. 2. The polymer-rich stream 255 was mixed with stream 259 and after adjusting for the minor MgSO$_4$ and the polymer losses, stream 260 was recycled back to the diluted osmotic agent stream 245, as shown in FIG. 2 for further extraction of water. Stream 257 had a water purity of about 99% with trace amounts of MgSO$_4$ and polymer as shown in Table 1.

Stream 257 was further treated in a purification device to achieve further purification for various end uses and to remove trace amounts of MgSO$_4$ and polymer. The purification device 261 was a reverse osmosis membrane 262 which retained all of the residual salt and polymer, thereby producing a purified water stream 258. The purified water exited the device as stream 258. The trace amounts of MgSO$_4$ and polymer exited the device as stream 259. The stream 259 was mixed with the stream 255. After adjusting for the minor MgSO$_4$ and the polymer losses, the final stream 260 was recycled back to the diluted osmotic agent stream 245 to extract more water, as shown in FIG. 2.

Two ratios were considered to evaluate the performance of the desalination process. The mass ratio of stream 257 to 252 was determined to be 0.199. The ratio provided an indicator of the effectiveness of the separation of the polymer from water by quantifying the amount of the water phase that was extracted from the polymer-rich stream 252. The mass ratio of stream 252 to stream 246 was determined to be 0.138. This ratio provided an indicator of system volume required to produce a predetermined amount of product water in stream 252 from stream 246 (i.e. the stream resulting from introducing polymer stream 260 into diluted osmotic agent stream 245).

TABLE 1

| Streams | 246 | 240 | 245 | 252 | 255 | 257 | 258 | 259 | 260 |
|---|---|---|---|---|---|---|---|---|---|
| Total grams | 200.00 | 172.29 | 177.29 | 27.71 | 22.20 | 5.52 | 5.00 | 0.52 | 22.71 |
| MgSO$_4$ (wt %) | 19.53 | 22.67 | 22.03 | 0.04 | 0.00 | 0.22 | 0.00 | 2.34 | 0.05 |
| UCON-660 (wt %) | 10.00 | 0.51 | 0.50 | 69.00 | 85.95 | 0.80 | 0.00 | 8.52 | 84.19 |
| Water (wt %) | 70.47 | 76.82 | 77.47 | 30.96 | 14.05 | 98.98 | 100.00 | 89.13 | 15.76 |

EXAMPLE 2

Effect of Lower Polymer Concentration

The water recovery and purification process for desalinating seawater as described in Example 1 was simulated for a lower concentration of the UCON® 50-HB-660 polymer in stream 246. The UCON® 50-HB-660 polymer concentration in stream 246 was reduced from 10% in Example 1 to 5%. The compositional and mass balance results that were achieved for this modified process are shown in Table 2 below.

TABLE 2

| Streams | 246 | 240 | 245 | 252 | 255 | 257 | 258 | 259 | 260 |
|---|---|---|---|---|---|---|---|---|---|
| Total grams | 200.00 | 184.51 | 188.51 | 15.49 | 11.10 | 4.40 | 4.00 | 0.40 | 11.49 |
| MgSO$_4$ (wt %) | 19.53 | 21.17 | 20.72 | 0.04 | 0.00 | 0.15 | 0.00 | 1.67 | 0.05 |
| UCON-660 (wt %) | 5.00 | 0.21 | 0.21 | 62.00 | 85.84 | 1.80 | 0.00 | 20.00 | 83.58 |
| Water (wt %) | 75.47 | 78.61 | 79.07 | 37.96 | 14.16 | 98.05 | 100.00 | 78.33 | 16.37 |

As can be seen in Table 2, the mass ratio of stream 257 to stream 252 was determined to be 0.284. Although this ratio was higher than that of Example 1, the total amount of desalinated water extracted was less compared to Example 1. Reducing the polymer concentration in stream 246 to 5% reduced stream 257 (which is representative of the amount of the water phase extracted from stream 246) from 5.52 grams (Table 1) to 4.40 grams. Additionally, the purity of water in stream 257 was reduced from 98.98% to 98.05%. Accordingly, the lower concentration of polymer produced a relatively poorer quality of product water compared to Example 1.

EXAMPLE 3

Effect of Centrifugation

The water recovery and purification process for desalinating seawater as described in Example 1 was repeated utilizing centrifugation rather than gravitational settling as the means of achieving separation of phases. Phase separation of stream 246 was achieved by centrifugation. In particular, centrifugation was utilized for separating the polymer-rich phase from the osmotic agent rich phase of stream 246. A centrifugal force of about 1744 g was applied to stream 246 for 5 minutes. The compositional and mass balance results that were achieved for this modified process are shown in Table 3 below.

TABLE 3

| Streams | 246 | 240 | 245 | 252 | 255 | 257 | 258 | 259 | 260 |
|---|---|---|---|---|---|---|---|---|---|
| Total grams | 200.00 | 168.64 | 176.64 | 31.36 | 22.91 | 8.45 | 8.00 | 0.45 | 23.36 |
| $MgSO_4$ (wt %) | 19.53 | 23.16 | 22.11 | 0.04 | 0.00 | 0.16 | 0.00 | 3.02 | 0.05 |
| UCON-660 (wt %) | 10.00 | 0.15 | 0.14 | 63.00 | 86.05 | 0.50 | 0.00 | 9.43 | 84.58 |
| Water (wt %) | 70.47 | 76.70 | 77.75 | 36.96 | 13.96 | 99.34 | 100.00 | 87.55 | 15.37 |

The centrifugation reduced the time required for separation of the phases in stream 246. The centrifugation also increased the mass ratio of stream 257 to stream 252 from 0.199 in Example 1 to 0.269 as determined from Table 3. A comparison of Table 1 and 3 shows that the amount of water rich phase, which is designated as stream 257, was over 50% greater than that of Example 1. Additionally, the purity and amount of water product (stream 257) was higher compared to Example 1. The mass ratio of stream 252 to stream 246 was about 14% higher than that of Example 1, which indicates a lower system volume was needed to produce the desired amount of purified desalinated water.

EXAMPLE 4

Effect of Lower Temperature During Formation and Separation of Two Phase Mixture The water recovery and purification process for desalinating seawater as described in Example 3 was repeated utilizing a lower temperature during separation of the polymer phase (stream 255 exiting separator 253) from the water-rich phase (stream 257 exiting separator 253). The temperature during this separation was lowered from 80° C. to 60° C. Centrifugation as described in Example 3 (1744 g for 5 minutes) was used in place of gravitational settling. The compositional and mass balance results that were achieved for this modified process are shown in Table 4 below.

TABLE 4

| Streams | 246 | 240 | 245 | 252 | 255 | 257 | 258 | 259 | 260 |
|---|---|---|---|---|---|---|---|---|---|
| Total grams | 200.00 | 170.19 | 173.19 | 29.82 | 26.44 | 3.37 | 3.00 | 0.37 | 26.82 |
| $MgSO_4$ (wt %) | 19.53 | 22.95 | 22.55 | 0.05 | 0.00 | 0.45 | 0.00 | 4.01 | 0.06 |
| UCON-660 (wt %) | 10.00 | 0.19 | 0.19 | 66.00 | 73.99 | 3.40 | 0.00 | 30.63 | 73.38 |
| Water (wt %) | 70.47 | 76.86 | 77.26 | 33.95 | 26.01 | 96.16 | 100.00 | 65.36 | 26.56 |

The lower temperature of separation resulted in a lower mass ratio of stream 257 to stream 252 of 0.113 compared to the ratio of 0.269 attained in Example 3. Additionally, product stream 257 contained 96.16% water purity compared to 99.34% water purity attained in Example 3. Accordingly, the amount of water and the purity of the water were less compared to Example 3.

EXAMPLE 5

The water recovery and purification process for desalinating as described in Example 1 was repeated with the addition of a small quantity of sodium chloride in the osmotic agent stream to simulate nonideality of the semi-permeable membrane. As can be seen in Table 5, the process results are comparable to those shown in Example 1 indicating substantial robustness of the process.

TABLE 5

| Streams | 246 | 240 | 245 | 252 | 255 | 257 | 258 | 259 | 260 |
|---|---|---|---|---|---|---|---|---|---|
| Total grams | 200.02 | 172.74 | 177.74 | 27.28 | 21.74 | 5.54 | 5.00 | 0.54 | 22.28 |
| $MgSO_4$ (wt %) | 19.53 | 22.60 | 21.97 | 0.10 | 0.00 | 0.51 | 0.00 | 5.22 | 0.12 |
| NaCl (%) | 0.35 | 0.40 | 0.39 | 0.04 | 0.00 | 0.19 | 0.00 | 1.95 | 0.05 |
| UCON-660 (wt %) | 10.00 | 0.05 | 0.05 | 73.00 | 91.44 | 0.65 | 0.00 | 6.66 | 89.38 |
| Water (wt %) | 70.11 | 76.94 | 77.59 | 26.86 | 8.56 | 98.65 | 100.00 | 86.17 | 10.45 |

EXAMPLE 6

The water recovery and purification process for desalinating was repeated with disodium hydrogen phosphate as the osmotic agent as shown in Table 6. It can again be seen that water of adequate quality can be obtained through the addition of polymer to the osmotic agent.

TABLE 6

| Streams | 246 | 240 | 245 | 252 | 255 | 257 | 258 | 259 | 260 |
|---|---|---|---|---|---|---|---|---|---|
| Total grams | 200.37 | 146.12 | 151.43 | 54.25 | 48.35 | 5.90 | 5.31 | 0.59 | 48.94 |
| $Na_2HPO_4$ (wt %) | 11.98 | 16.42 | 15.84 | 0.03 | 0.00 | 0.24 | 0.00 | 2.40 | 0.03 |
| UCON-660 (wt %) | 20.14 | 0.00 | 0.00 | 74.40 | 83.36 | 1.00 | 0.00 | 10.00 | 82.47 |
| Water (wt %) | 67.88 | 83.58 | 84.16 | 25.57 | 16.64 | 98.76 | 100.00 | 87.60 | 17.49 |

The above examples 1-6 disclose that the extraction of water by the polymer can occur at ambient temperature and pressure operating conditions, with the exception of the separation step requiring heating of the UCON® 50-HB-660 polymer at least to its cloud point temperature. Waste heat from a power plant, solar energy or any other suitable source may be used to supply the heat energy requirements when heating UCON® 50-HB-660 polymer to its cloud point temperature. Preferably, the UCON® 50-HB-660 is heated to a maximum of about 25° C. above cloud point temperature to release the captured water, in the interests of minimizing the input energy requirement. However, heating beyond such a range is contemplated within the scope of this embodiment. Further release of water may be accomplished by heating beyond 25° C. above the open cloud point temperature. The upper limit of this range may be governed by numerous factors, including the temperature at which decomposition or changes to the chemistry of the polymer may occur. Preferably, the UCON® 50-HB-660 is heated to 24° C. above its cloud point temperature to release the captured water. The cloud point of 1% UCON® 50-HB-660 in water is about 56° C. In one example, the UCON® 50-HB-660 may be heated to a cloud point temperature ranging from about 5° C. to about 95° C. The exact cloud point temperature will be primarily dependent upon the polymer used.

The amount of waste heat required may be significantly less than the energy required for conventional desalination processes. Accordingly, the disclosed process may significantly reduce the costs associated with energy intensive desalination processes such as distillation, which typically require higher temperatures and pressures and often necessitate phase change of the material being processed. Additionally, the disclosed process does not require chemical precipitants as are commonly used in conventional processes. Rather, the materials used in the disclosed process may be reusable. The polymers may be recycled back to selectively extract additional water from the diluted osmotic agent stream 245. The osmotic agent salts may be recycled back to the forward osmosis unit to induce additional water 211 flow via forward osmosis. Furthermore, unlike conventional desalination processes, the NaCl concentration in stream 220 may be concentrated to greater than 10%. The disclosed desalination process is sufficiently robust such that it can work with any incoming salt concentration in the seawater feed stream 210 provided it is lower in osmotic concentration relative to stream 245.

Examples 1-6 indicate that the concentration of osmotic agent salt $MgSO_4$ was slightly over 20% in osmotic agent stream 240. Such a high concentration of the $MgSO_4$ enables the NaCl in solute stream 220 to be as concentrated as 8%. Generally speaking, the desalination process will preferably utilize the highest amount of $MgSO_4$ possible in stream 240 to create the lowest water activity (i.e. the highest osmotic pressure) and therefore the maximum driving force to induce the flow of water from the seawater feed stream 210 to the osmotic agent stream 240.

In an alternative embodiment, an alternative osmotic salt agent capable of further dewatering seawater feed stream 210 may be provided such that solute stream 220 may comprise up to about 15% NaCl. One suitable osmotic agent salt that may accomplish this is disodium hydrogen phosphate, which possesses higher water solubility than $MgSO_4$ at room temperature. The higher solubility of disodium hydrogen phosphate enables stream 240 to exert a higher osmotic pressure, thereby inducing a greater flow of water 111 such that solute stream 220 can be concentrated up to about 15% NaCl. Up to about 40% of the disodium hydrogen phosphate can be utilized at about 40° C.

As before, the osmotic agent salt solution stream 240 exits the forward osmosis unit 230 as stream 245, which is now diluted with a higher amount of water than possible with $MgSO_4$. Stream 245 may be cooled to form crystals of disodium hydrogen phosphate to drive at least a portion of the disodium hydrogen phosphate out of solution of stream 245 to reduce the concentration of salt in the aqueous phase to about 7-10%. The remaining disodium hydrogen phosphate solution of the stream 245 may then be extracted to obtain desalinated water by using a polymer extraction process, such as the process explained above in accordance with FIGS. 1 and 2 and Examples 1-6.

It should be appreciated that the above described methods and compositions are capable of being incorporated in the form of a variety of embodiments, only a few of which have been illustrated and described above. The invention may be embodied in other forms without departing from its spirit or essential characteristics. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

The invention claimed is:

1. A method of recovering a solvent from a feed stream comprising the solvent and dissolved solutes, comprising the steps of:
   inducing a flow of the solvent from the feed stream into an osmotic agent solution stream to cause separation of the solvent from the dissolved solutes;
   introducing a polymer having a cloud point temperature into a first separator comprising the osmotic agent solution stream at a first temperature;
   extracting the solvent from the osmotic agent solution stream at the first temperature, whereby a two-phase mixture comprising a first phase and a second phase is created, the first phase comprising the osmotic agent solution stream and the second phase comprising the polymer with the extracted solvent;
   separating the second phase from the first phase;
   heating the second phase in a second separator to at least the cloud point temperature of the polymer to form a polymer rich phase and a solvent rich phase; and
   separating the polymer rich phase and solvent rich phase comprising at least 95 wt % of the extracted solvent.

2. The method of claim 1, further comprising the step of recycling the polymer rich phase to the first separator.

3. The method of claim 1, further comprising the step of recycling the first phase to an upstream processing unit.

4. The method of claim 1, further comprising the step of purifying the extracted solvent.

5. The method of claim 1, wherein the step of separating the second phase from the first phase comprises centrifugation.

6. The method of claim 1, wherein the step of separating the second phase from the first phase comprises gravitational settling.

7. The method of claim 1, wherein the step of separating the polymer rich phase from the solvent rich phase comprises centrifugation.

8. The method of claim 1, wherein the step of separating the polymer rich phase from the solvent rich phase comprises gravitational settling.

9. The method of claim 1, wherein the polymer has a molecular weight ranging from 500 Daltons to about 10000 Daltons.

10. The method of claim 1, wherein the polymer has a cloud point temperature ranging from about 5° C. to about 95° C.

11. The method of claim 1, wherein the inducing the flow of solvent comprises passing the solvent through a semipermeable membrane that is impermeable to the dissolved solutes.

12. A method of recovering water from a feed salt solution comprising water and dissolved solutes, comprising the steps of:
   introducing the feed salt solution into an upstream unit at a first osmotic pressure;
   introducing an osmotic agent solution comprising an effective amount of an osmotic agent, wherein the osmotic agent solution comprises a second osmotic pressure greater than the first osmotic pressure;
   inducing a flow of water from the feed salt solution into the osmotic agent solution to cause separation of the water from the dissolved solutes;
   discharging the feed salt solution from the upstream unit, the discharged solution having a salt concentration higher than a salt concentration of the feed salt solution;
   discharging the osmotic agent solution having a first temperature from the upstream unit into an extraction process, whereby a polymer solution having a cloud point temperature and comprising a polymer selectively absorbs the water from the osmotic agent solution to create a dehydrated osmotic agent solution, thereby creating at the first temperature of the osmotic agent solution a two-phase mixture comprising a first phase and a second phase, the first phase comprising the dehydrated osmotic agent solution and the second phase comprising the polymer solution with the absorbed water; and
   heating the polymer solution with the absorbed water above the cloud point temperature to release the water from the polymer solution to produce a polymer rich phase and a water rich phase, the water rich phase comprising at least 95 wt % water.

13. The method of claim 12, wherein the osmotic agent is magnesium sulfate.

14. The method of claim 12, further comprising the step of recycling the dehydrated osmotic agent solution to the upstream unit in a flow direction countercurrent to the flow of the feed salt solution.

15. The method of claim 12, wherein the polymer is a co-polymer of polyethylene oxide and polypropylene oxide.

16. The method of claim 12, further comprising the steps of:
   purifying the water rich phase to recover any residual polymer or residual osmotic agent; and
   recycling the residual polymer or the residual osmotic agent to the extraction process.

17. The method of claim 12, wherein the upstream unit comprises forward osmosis, microfiltration, ultrafiltration, pervaporation, osmotic distillation, membrane distillation, or any combination thereof.

18. The method of claim 12, wherein the first temperature is an ambient temperature.

19. The method of claim 12, wherein the inducing the flow of water comprises passing the water through a semipermeable membrane that is impermeable to the dissolved solutes.

20. A method of desalinating a salt water solution comprising water and dissolved solutes, comprising the steps of:
- introducing the salt water solution into an upstream unit at a first osmotic pressure;
- introducing an osmotic agent solution comprising an effective amount of an osmotic agent into the upstream unit, the osmotic agent solution having a second osmotic pressure greater than the first osmotic pressure;
- inducing a flow of water from the salt water solution into the osmotic agent solution to cause separation of the water from the dissolved solutes;
- discharging the salt water solution from the upstream unit;
- discharging the osmotic agent solution having a first temperature from the upstream unit into an extraction process, whereby a polymer solution having a cloud point temperature and comprising a polymer selectively absorbs the water from the osmotic agent solution, thereby creating at the first temperature of the osmotic agent solution a two-phase mixture comprising a first phase and a second phase, the first phase comprising a dehydrated osmotic agent solution and the second phase comprising the polymer solution with the absorbed water; and
- heating the polymer solution with the absorbed water to at least the cloud point temperature to release the water from the polymer solution and produce a polymer rich phase and a water rich phase having a composition of at least 95 wt % water.

21. The method of claim 20, further comprising the steps of:
- removing a portion of the osmotic agent from the extraction process; and
- recycling the removed portion of the osmotic agent into the upstream unit.

22. The method of claim 20, further comprising the steps of:
- crystallizing a portion of the osmotic agent from the osmotic agent solution from the upstream unit; and
- recycling the crystallized portion of the osmotic agent into the upstream unit.

23. The method of claim 20, wherein the osmotic agent comprises disodium hydrogen phosphate.

24. The method of claim 1, wherein the first temperature is an ambient temperature.

25. The method of claim 20, wherein the inducing the flow of water comprises passing the water through a semipermeable membrane that is impermeable to the dissolved solutes.

* * * * *